(12) United States Patent
Chen et al.

(10) Patent No.: US 8,731,388 B1
(45) Date of Patent: May 20, 2014

(54) METHOD FOR AUTOMATICALLY FOCUSING APPLIED TO CAMERA MODULE

(71) Applicant: LarView Technologies Corporation, Yangmei (TW)

(72) Inventors: Chien-I Chen, Miaoli County (TW); Chien-Hsing Ho, New Taipei (TW); Ching-Yao Hsu, Hsinchu (TW)

(73) Assignee: LarView Technologies Corporation, Yangmei, Taoyuan County (TW)

( * ) Notice: Subject to any disclaimer, the term of this patent is extended or adjusted under 35 U.S.C. 154(b) by 0 days.

(21) Appl. No.: 13/724,402

(22) Filed: Dec. 21, 2012

(51) Int. Cl.
*G03B 3/00* (2006.01)
*G03B 3/10* (2006.01)

(52) U.S. Cl.
USPC .............................. 396/89; 396/104; 396/121

(58) Field of Classification Search
CPC .............. G03B 3/00; G03B 3/02; G03B 3/10; G03B 13/18; G03B 13/20; G03B 13/22
USPC ...................... 396/89, 104, 125, 121; 348/345
See application file for complete search history.

(56) References Cited

U.S. PATENT DOCUMENTS 7,634,183 B2 * 12/2009 Chin et al. ...................... 396/89

\* cited by examiner

*Primary Examiner* — W B Perkey
*Assistant Examiner* — Minh Phan
(74) *Attorney, Agent, or Firm* — Muncy, Geissler, Olds & Lowe, P.C.

(57) ABSTRACT

The present invention provides a method for automatically focusing applied to a camera module. The method comprises the following steps: (a). determining a value of a modulation transfer function of an image at a center area and four corner areas of a lens by a processing unit; (b). determining whether the number of times of decreased or unchanged of the value of the modulation transfer function at the center area is over a predetermined value; and (c). if over the predetermined vale, then determining the average of the value of the modulation transfer function at the four corner areas by the processing unit, to determine the maximum of the value of the modulation transfer function at the center area.

10 Claims, 3 Drawing Sheets

METHOD FOR AUTOMATICALLY FOCUSING APPLIED TO CAMERA MODULE

TECHNICAL FIELD

The present invention generally relates to a method for automatically focusing, more particularly, to a method for automatically focusing applied to a camera module.

BACKGROUND

A traditional camera module includes an image sensor and one or more lens set. The lens set is disposed above the image sensor for the incident ray image mapping to the image sensor. Camera module with the image sensor can be applied to digital cameras, digital video recorders, mobile phones, smart phones, monitors and others electronic products with camera function. For camera module, it needs to ensure the image quality and meet the requirement of trend of miniaturization of the electronic products.

For camera module, focusing is a critical step to ensure the recorded images with a good image quality. Focusing is by adjusting the distance between the lens and the image sensor such that the image plane falls on the imaging surface of the image sensor. Currently, the common camera module uses an automatically focusing, i.e., in accordance with the distance from the captured object, by a driving circuit to drive the motor for pushing the lens to a corresponding position, so that the image of the captured object has a good resolution.

Automatically focusing includes an active autofocus and a passive autofocus. The active autofocus is utilizing by a camera module emitting infrared or ultrasonic to the captured object, and then the reflected infrared or ultrasonic back to a sensor and computed by a digital signal processor to obtain the distance between the camera mode and the captured object, followed by controlling an actuator to move the lens to achieve accurately focusing. The passive autofocus is utilizing a camera module to receive the reflective light from the captured object to determine the distance for automatically focusing.

For camera module, in order to ensure the image quality, it needs to strictly control the factors of affecting imaging quality to meet the requirement of higher and higher resolution of the lens module. For camera module assembly process, the tolerance of the lens and the actuator will cause the offset of the modulation transfer function (MTF) curve, so that the MTF value at the center and the corner of the lens produces a balanced condition, and therefore impacting automatic focus and imaging quality of the camera module. Characteristic diagram of MTF reflects imaging quality performance at the position from the central region to the corner (edge) of the lens.

Therefore, based-on the shortcomings of prior arts, the present invention provide a newly method for automatically focusing applied to a camera module to enhance the quality of the camera module.

SUMMARY OF THE INVENTION

Based-on the shortcomings of the above-mentioned, an objective of the present invention is to provide a method for automatically focusing applied to a camera module to improve the resolution at the center area of the lens as compared means of weights allocation plus the climbing method.

Another objective of the present invention is to cure the lower resolution at four corners of the lens due to using the climbing method.

Yet another object of the present invention is to cure the MTF curve offset caused by the tolerances between the lens and the actuator in assembly process of the camera module, that is, the imbalance of the MTF values at the center and the corner of the lens, in order to enhance the quality of the camera module.

According to an aspect of the present invention, the present invention provides a method for automatically focusing applied to a camera module. The method comprises the following steps: (a). determining a value of a modulation transfer function of an image at a center area and four corner areas of a lens by a processing unit; (b). determining whether the number of times of decreased or unchanged of the value of the modulation transfer function at the center area is over a predetermined value; and (c). if over the predetermined value, then determining the average of the value of the modulation transfer function at the four corner areas by the processing unit, to determine the maximum of the value of the modulation transfer function at the center area.

The method further comprises a step of a format of the image to be transferred before the step (a).

If the number of times of decreased or unchanged of the value of the modulation transfer function is not over a predetermined value, then pushing the lens and performing the step (a) until the number of times of decreased or unchanged of the value of the modulation transfer function is over a predetermined value.

The step of pushing the lens is driven by an actuator, wherein the actuator includes a voice coil motor. A number of driven steps of the voice coil motor is determined by the value of the modulation transfer function at the center area.

After determining a maximum of the value of the modulation transfer function at the center area, the lens is pushed corresponding to the maximum.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention provides a method for automatically focusing applied to a camera module. The camera module can be used in digital cameras, digital video recorders, mobile phones, smart phones, personal digital assistant, cameras, tablet PCs, monitors and other electronic products with camera function. Automatically focusing method of the present invention may be applied to the assembly camera module (including a lens, an actuator and an optical image stabilizer etc.) for improving the resolution of the lens.

For auto focus of the camera module, after obtaining the distance between the camera module and the object, it needs to make the lens move a certain distance by the actuator. Because the actual movement of the lens will not be fully slid to a predetermined position, it is need to distinguish the actual slide position of the lens of the camera module; otherwise it is difficult to accurately control the movement of the lens. As calculate the required movement of the lens, the lens is driven by the actuator for moving the desired amount of movement to focus automatically.

A method for automatically focusing applied to the camera module of the present invention comprises: using a hill-climbing method in order to locate the focal zone at the center of the lens (the highest MTF value), and combining with the average MTF value for the four corners of the lens to determine a peak within the focal zone in order to achieve the purpose of the central area and the corners with excellent resolution. The detailed descriptions are described below.

Figure 1:
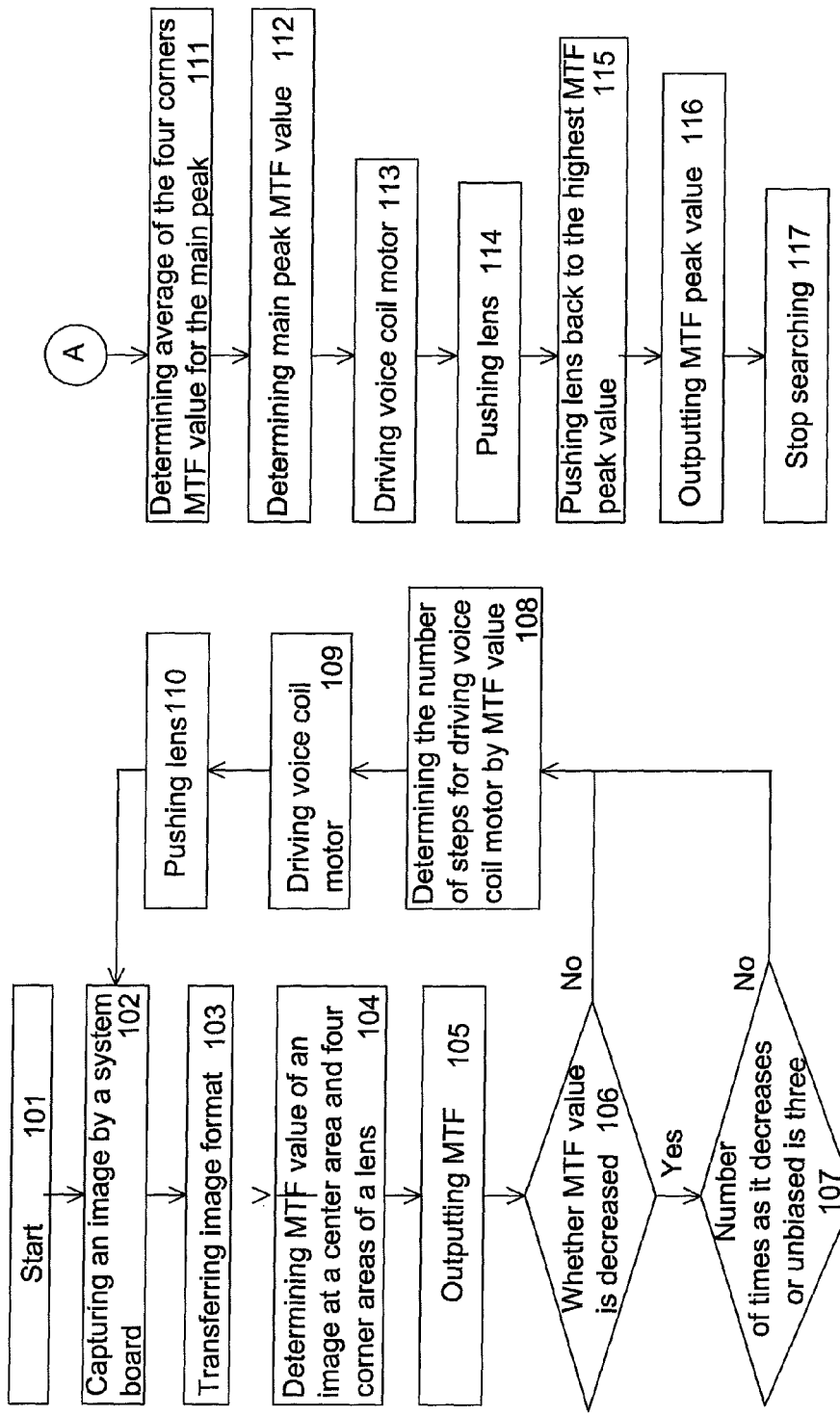
FIG. 1 illustrates a flow chart of a method for automatically focusing applied to a camera module according to the present invention.

FIG. 1 shows a flow chart of a method for automatically focusing applied to a camera module according to the present invention. Firstly, in the step 101, a start procedure is activated. In this embodiment, a hill-climbing method is utilized to perform an automatically focusing process. The hill-climbing method is then activated. The hill-climbing method is a controlling method for automatically focusing, wherein the photographic lens initially moves in a direction and contrast signal as the photographic lens moves is compared; if a level of the compared contrast signal is increased, the photographic lens continues to move toward the same direction, and if the level of the compared contrast signal is reduced, the photographic lens moves in the opposite direction. The hill-climbing method requires only a short time to precisely control the focal length.

In the following, in the step 102, an image is captured. For example, the image is captured by a system board. The system board is a mother board of the camera module, which can be a printed circuit board. The mother board comprises a CPU (or processing unit) for executing the function of instructions, operations and controls. Subsequently, in the step 103, a format of the image is transferred. In this step, the captured image is performed an image format transferring. Then, in the step 104, MTF value of the format-transferred image at a center area and four corner areas of the lens is determined. In the step 105, MTF value at the center area and the four corner areas of the lens is computed to output. Next, in the step 106, it determines whether MTF value is decreased. This determination is made by comparing the outputted MTF value with the initial value. As the outputted MTF value is not decreased, the climbing process is continued. Therefore, the photographic lens continues to move forwardly. Subsequently, in the step 108, the movement of the photographic lens is determined by MTF value. For example, the number of steps for driving a voice coil motor is determined by MTF value. Then, in the step 109, the voice coil motor is driven. In the step 110, the photographic lens is pushed. For zoom in, the number of steps for pushing the lens is determined by MTF value. The steps pushing the lens are rapidly increased in the low MTF region, while the steps are slowly advancing in high MTF region to search for the peak. Next, in the step 102, an image is then captured. It continues searching the peak by computing MTF value and pushing the lens.

The above-mentioned instructions, computation and operations may be executed by the CPU of the mother board.

Similarly, in the step 106, it determines whether MTF value is decreased. As the outputted MTF value is decreased, it indicates that a peak is created. The practical MTF value or contrast signal has several of sub-peaks, while the position of the focal length responses to a main-peak. Therefore, the sub-peaks may be detected prior to the main peak detected, and the photographic lens may retain as the sub-peaks are detected. In other words, in the step 106, as MTF value is decreased, the following step 107 is then performed, which determines the number of times as it decreases. That is, the number of times of the peaks is found. In this embodiment, the baseline for the number of times as it decreases or unbiased is three. As the number of times as MTF value decreases or unbiased is three, a climbing process of the hill-climbing method is stop. As the number of times as MTF value decreases or unbiased is not over three, the hill-climbing method is then continuing for searching another peak. Next, in the step 108, the number of steps for driving the voice coil motor is determined by MTF value at the center area. Subsequently, in the step 109, the voice coil motor is driven. In the step 110, the photographic lens is then pushed, and followed by the step 102, capturing another image. Another (new) peak is then searching for.

In the step 107, the number of times as MTF value decreases or unbiased is three. After stopping the climbing process of the hill-climbing method, it asserted that the main-peak has arrived as the number of times as MTF value decreases or unbiased is three. It makes sure to find the focal zone at the center of the lens (the highest MTF value).

Next, it is to determine where the main peak is within the region of the focus according to the average of the MTF value for four corners of the lens. In the step 111, the average of the MTF value for the four corners (including upper left, upper right, lower left and lower right) of the lens is calculated. The average of the four corners MTF value for the main (central) peak is therefore determined. Then, in the step 112, the main (central) peak MTF value is determined based-on the average of the four corners MTF value. Next, in the step 113, the voice coil motor is driven. The photographic lens is pushed, in the step 114. As MTF value has decreased, the lens is then pushed to the recorded number of steps for the highest MTF value (peak), in the step 115. In the step 116, the MTF peak value is outputted. In other words, the central MTF peak value is found, and the focal zone (highest MTF value) at center of the lens is found. Then, it is stop searching, in the step 117.

Figure 2:
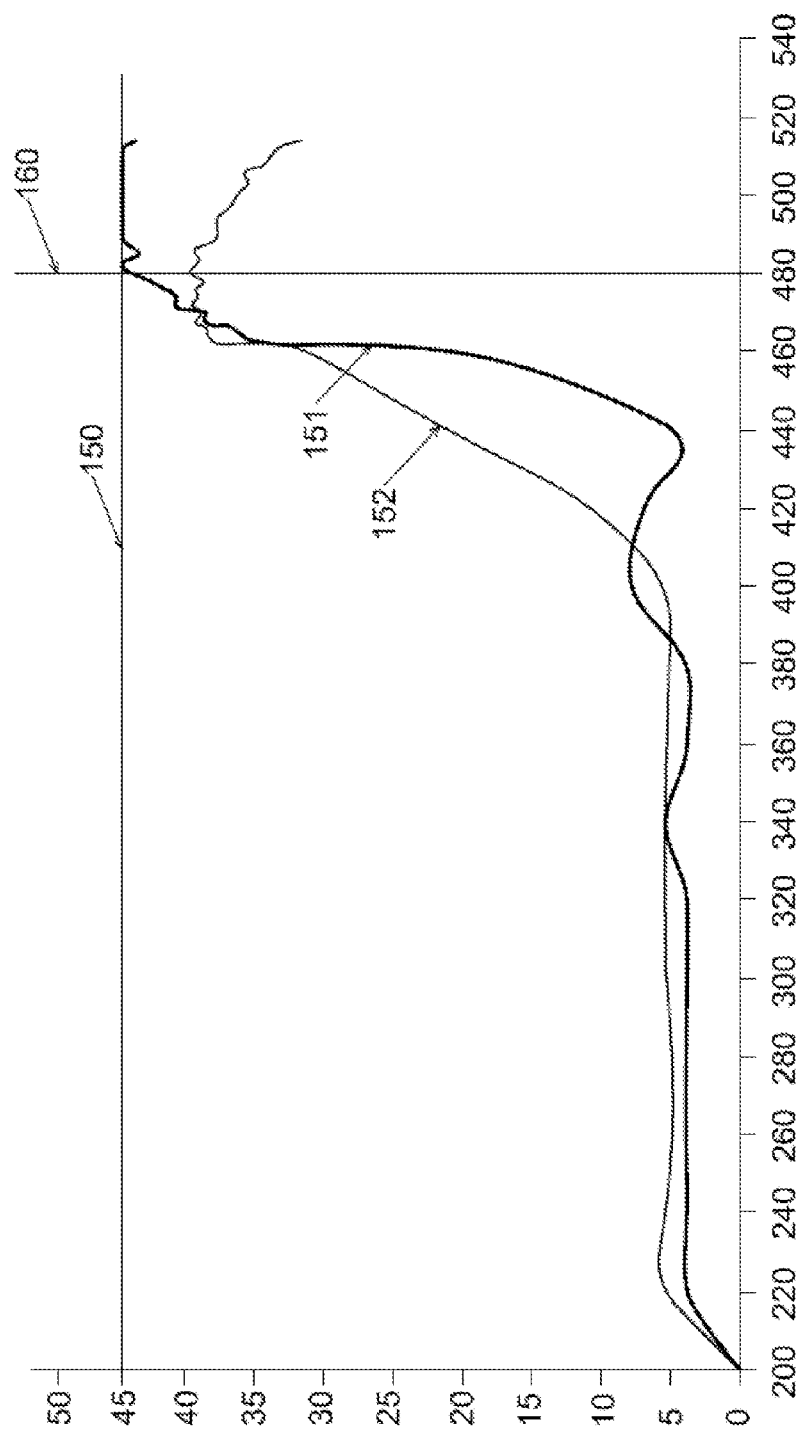
FIG. 2 illustrates a MTF curve in practical applications of the present invention.

FIG. 2 shows a MTF curve in practical applications of the present invention. The curve 151 is the central MTF curve, while the curve 152 is a graph of the averaging MTF value for the four corners. In the FIG. 2, the horizontal coordinate represents the position of the focusing lens, and the longitudinal coordinate represents the evaluation value of the auto focus. In the FIG. 2, utilizing the method of the present invention, in near the highest central MTF value 150, the higher corner MTF value may be obtained, and the resolution at the center and the corners of the lens are also considered together. The straight line 160 corresponds to the average of the four corners MTF value, and the climbing method is utilized to find the central MTF.

Figure 3:
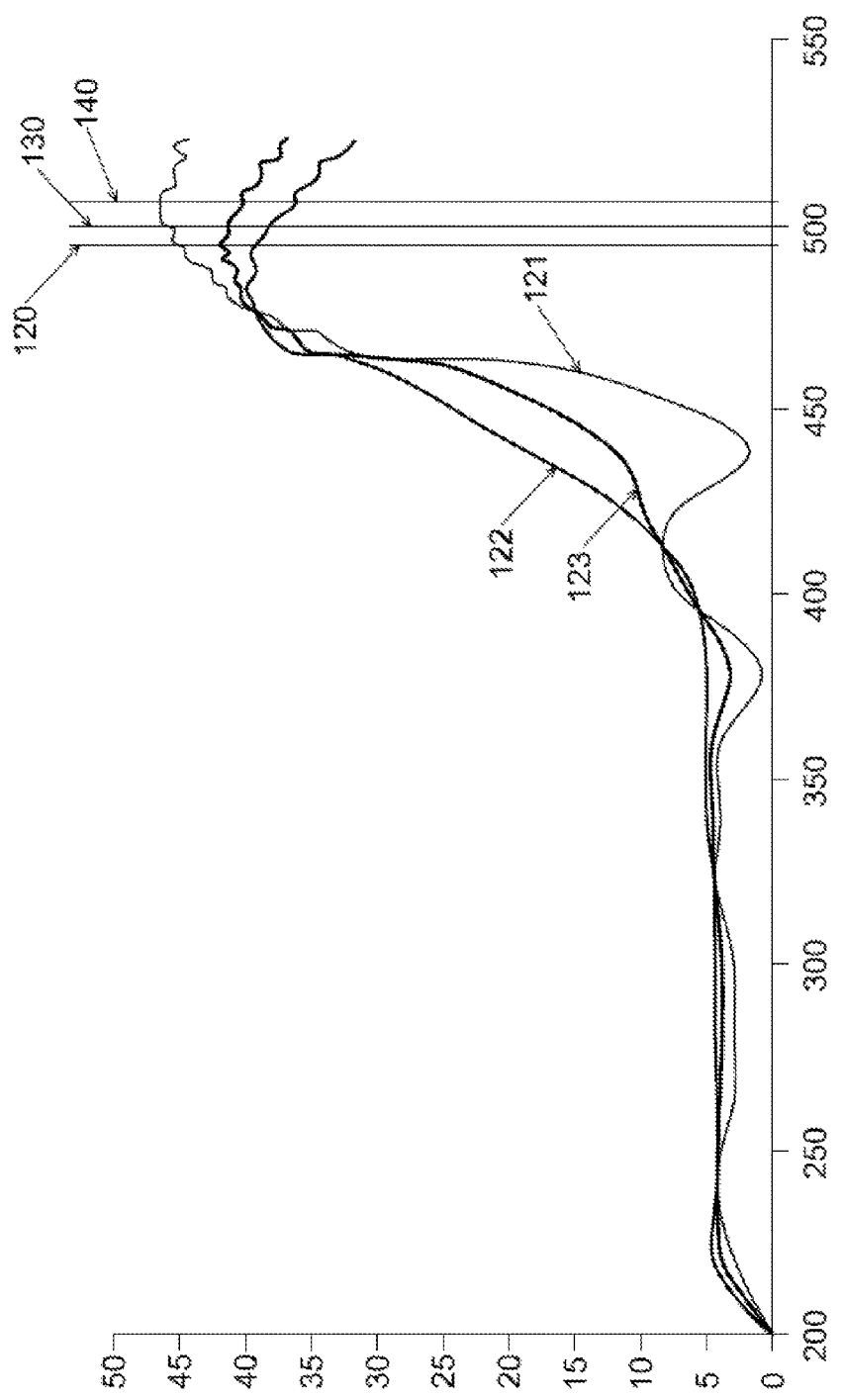
FIG. 3 illustrates the MTF curve by using different methods.

FIG. 3 shows the MTF curve by using different methods. Wherein a curve 121 represents the central MTF curve, a curve 122 represents a graph of the averaging MTF value (curve) for the four corners, and a curve 123 indicates a graph of the weighted allocation of MTF curve for the four corners and the center of the lens. Straight line 120 corresponds to means of weights allocation and climbing method, straight line 130 corresponding to averaging MTF value for the four corners with central MTF by using climbing method, and straight line 140 corresponding to only using climbing method. In the FIG. 3, for searching the peak by the hill-climbing method, the central MTF value and the corner MTF value are 47 and 36 respectively, and the corner MTF value will be the lowest value. For means of weights allocation and the climbing method, based-on the highest point of weight curve 123, the central MTF values and the corner MTF values are 45 and 39 respectively. The corner MTF value, 39, is increased as compared to the MTF value by the traditional climbing method, 36, but the important central MTF value, 45, is decreased. The method according to the present invention may be referred by the FIG. 3 that the central MTF value of 47 is the same as the traditional climbing methods, but the corner MTF value of 38 is greatly enhancing. As compared to means of weights allocation combined with the climbing method, the central MTF value will be increased and the corner MTF value is slightly reduced.

The climbing methods plus means of weights allocation for the corner MTF vale and the central MTF value of the lens may improve the resolution at the corner area, but it will affect the central MTF values; the climbing method is used only such that the resolution of the center area is the best, but the resolution of the corners is lower. However, the method of the present invention is utilizing the averaging MTF value for the four corners with central MTF by using climbing method, and thus achieving the corners and the central MTF values are also high.

The foregoing descriptions are preferred embodiments of the present invention. As is understood by a person skilled in the art, the aforementioned preferred embodiments of the present invention are illustrative of the present invention rather than limiting the present invention. The present invention is intended to cover various modifications and similar arrangements included within the spirit and scope of the appended claims, the scope of which should be accorded the broadest interpretation so as to encompass all such modifications and similar structures.

What is claimed is:

1. A method for automatically focusing applied to a camera module, comprising:

(a) determining a value of a modulation transfer function of an image at a center area and four corner areas of a lens by a processing unit;
   (b) determining whether a number of times of decreased or unchanged of said value of said modulation transfer function at said center area is over a predetermined value; and
   (c) if over said predetermined value, then determining an average of said value of said modulation transfer function at said four corner areas by said processing unit, to determine a maximum of said value of said modulation transfer function at said center area.

2. The method of claim 1, further comprising a step of a format of said image to be transferred before said step (a).

3. The method of claim 1, wherein if said number of times of decreased or unchanged of said value of said modulation transfer function is not over said predetermined value, then pushing said lens and performing said step (a) until said number of times of decreased or unchanged of said value of said modulation transfer function is over said predetermined value.

4. The method of claim 3, wherein said pushing said lens is driven by an actuator.

5. The method of claim 4, wherein said actuator includes a voice coil motor.

6. The method of claim 5, wherein a number of driven steps of said voice coil motor is determined by said value of said modulation transfer function at said center area.

7. The method of claim 1, wherein after said determine the maximum of said value of said modulation transfer function at said center area, pushing said lens corresponding to said maximum.

8. The method of claim 7, wherein said pushing said lens is driven by an actuator.

9. The method of claim 8, wherein said actuator includes a voice coil motor.

10. The method of claim 8, wherein said predetermined value is three.

* * * * *